April 3, 1956   R. C. SANDERS, JR., ET AL   2,740,294
WIND DRIFT COMPUTERS
Filed Dec. 31, 1952   2 Sheets-Sheet 1
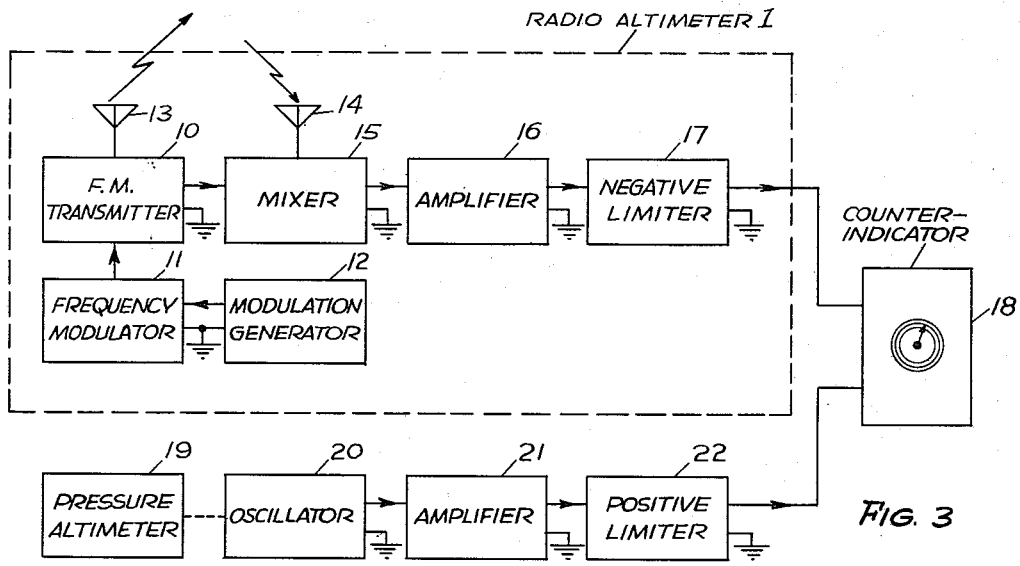
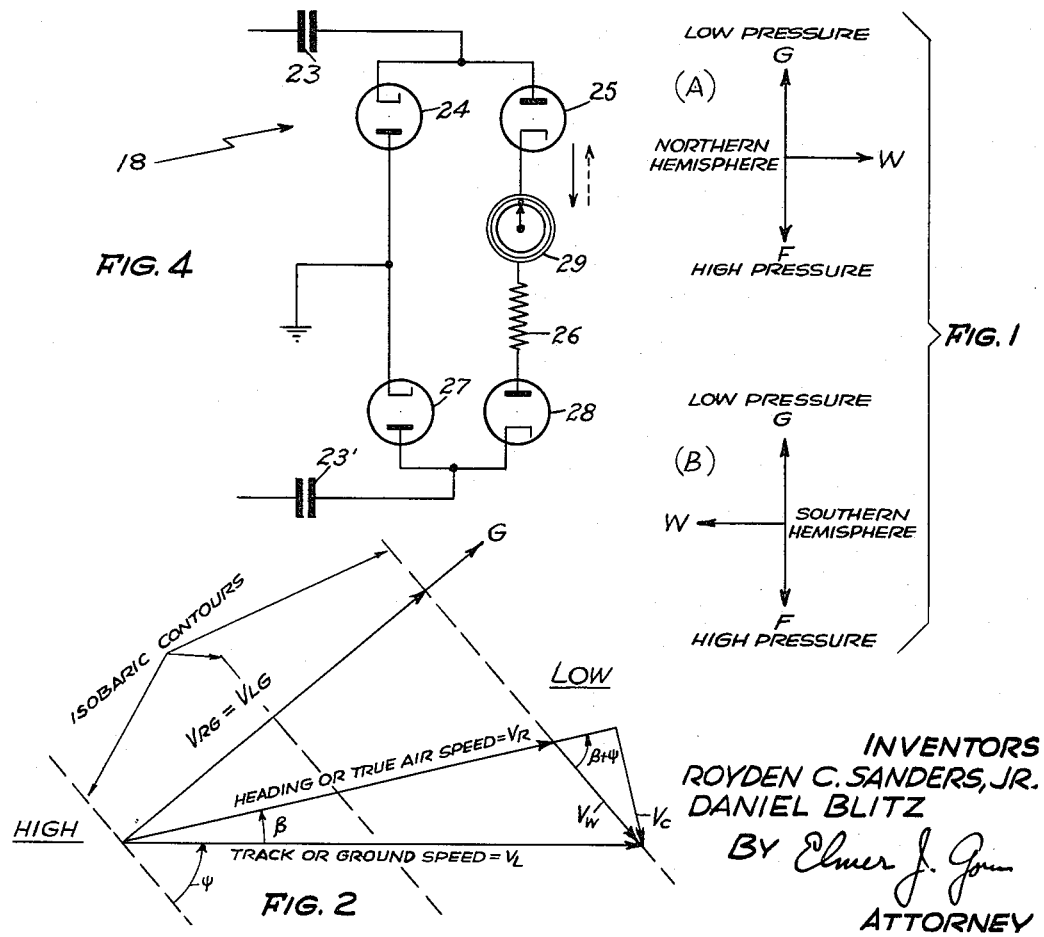
INVENTORS
ROYDEN C. SANDERS, JR.
DANIEL BLITZ
BY Elmer J. Gorn
ATTORNEY April 3, 1956   R. C. SANDERS, JR., ET AL   2,740,294
WIND DRIFT COMPUTERS
Filed Dec. 31, 1952   2 Sheets-Sheet 2
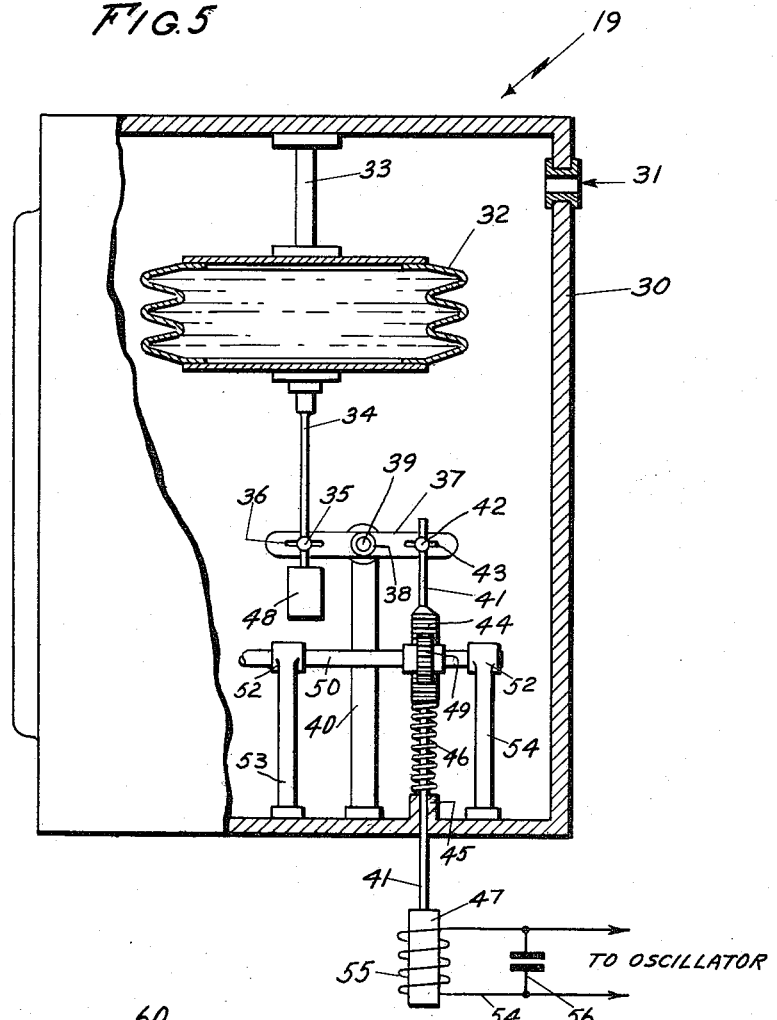
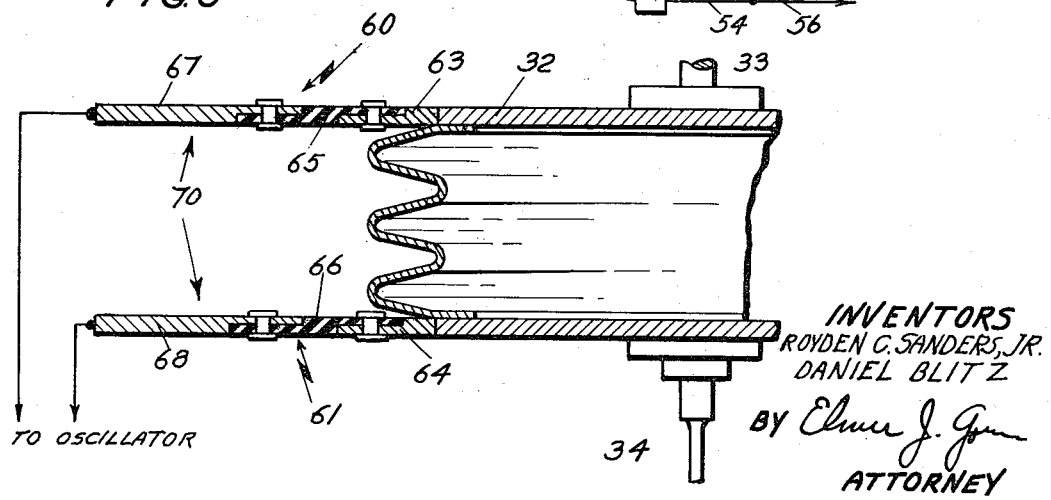
INVENTORS
ROYDEN C. SANDERS, JR.
DANIEL BLITZ
BY Elmer J. Gorn
ATTORNEY

United States Patent Office 2,740,294
Patented Apr. 3, 1956

2,740,294

WIND DRIFT COMPUTERS

Royden C. Sanders, Jr., Lexington, and Daniel Blitz, Boston, Mass., assignors to Raytheon Manufacturing Company, Newton, Mass., a corporation of Delaware Application December 31, 1952, Serial No. 328,836

3 Claims. (Cl. 73—178)

This invention relates to a device for use in computing the sideways drift of an aircraft resulting from cross winds and, more particularly, relates to a device for measuring the rate of change of barometric pressure along the flight path of an aircraft.

The computation of sideways drift of an aircraft owing to cross winds is important in aircraft navigation, particularly over long flights such as transoceanic flights where weather information and accurate radio location systems are unavailable.

The drift angle, that is, the angle between the aircraft track and the aircraft heading due to the geostrophic wind, is equal to the arcsine of the ratio of the geostrophic wind speed normal to the aircraft heading and the true air speed. The latter is readily determinable. To determine the former, it is necessary to solve an equation which may be derived from the geostrophic wind equation, in a manner to be described more fully later.

Pursuant to this invention, a wind drift computer is carried in the aircraft and includes a conventional FM radio altimeter whose beat frequency is proportional to altitude. The equipment also includes a barometric or pressure altimeter whose mechanism is adapted to vary the position of a tuning means in the tuned circuit of a conventional oscillator, thereby varying the frequency of said oscillator as a linear function of the barometric pressure or pressure altitude. The outputs of the radio altimeter and oscillator are fed into a frequency counter whose output is proportional to the difference in frequency of said oscillator and radio altimeter. An indicating meter of the zero center type connected in the counter circuit is indicative of the magnitude and algebraic sign of the difference between the two altimeter readings, that is, the difference at a given point in the flight path between the pressure altitude and the radio altitude.

The aircraft may be flown at either a constant pressure altitude or a constant radio altitude, although this is not necessary since the pressure altimeter is preferably set at the first point in the flight path so that the difference frequency of the oscillator and radio altimeter is zero, that is, so that the indicator reads zero. At a second point in the flight path the indicating meter is again observed.

The geostrophic wind component normal to the heading is calculated by multiplying the reading of the indicating meter by a constant which is dependent upon latitude and dividing this product by the product of the time taken to travel from the first to the second points in the flight path and the true air speed. Having computed this geostrophic wind component normal to the heading, the drift angle may then be readily determined as the arcsine of the ratio of this geostrophic wind component to the true air speed. The direction of the drift is determined by noting which side of zero the indicating meter needle is deflected.

In the drawings:

Fig. 1 illustrates the geostrophic balance in the northern and southern hemispheres;

Fig. 2 is a diagram explanatory of the method of computing wind drift;

Fig. 3 is a schematic diagram of a preferred embodiment of the invention;

Fig. 4 illustrates schematically the counter-indicator circuit of Fig. 3;

Fig. 5 is a cross-sectional view showing pertinent details of the pressure altimeter of Fig. 3; and Fig. 6 is a fragmentary view showing a modification of the pressure altimeter shown in Fig. 5.

In the atmosphere surrounding the earth, many areas of low pressure and high pressure are encountered. A low pressure area is characterized by a center of minimum pressure with an indefinite area surrounding said center in which the pressure gradually increases as the distance from this center increases. High pressure areas are characterized by a center of relatively high pressure and a surrounding area in which the pressure decreases with distance from the center. If it were not for the rotation of the earth, the air would move from high to low pressure by the most direct route. This most direct path from high to low pressure is the one along which the pressure is changing most rapidly and is called the pressure gradient. It is customarily measured in the direction of decreasing pressure. The lines connecting points of equal pressure at a given level are known as isobars. The gradient G will always be in a direction normal to the isobars. If the horizontal pressure gradient provided the only horizontal force acting on the air, the wind would blow directly across the isobars in the direction of G and, for a given mass, with an acceleration proportional to the magnitude of the gradient G. The pressure-gradient force, that is, the net force for unit mass $\rho$ exerted by the horizontal pressure gradient, is equal to $$-\frac{1}{\rho}\frac{\partial p}{\partial n}$$

and is directed down the gradient of pressure.

Because of the rotation of the earth, a second force, known as the Coriolis force, must be taken into consideration. This Coriolis force is well known in meteorology and is described by Byers in chapter 8 of General Meteorology first edition, published by McGraw-Hill Book Company. The Coriolis force is always 180 degrees from the direction of the pressure-gradient force. The wind resulting when the pressure gradient force balances the Coriolis force is known as the geostrophic wind. Referring to Fig. 1, the geostrophic balance in the northern and southern hemispheres is shown. Fig. 1a shows the direction of the geostrophic wind in relation to the pressure gradient and Coriolis force for the northern hemisphere. The pressure gradient force is directed toward the low pressure area, as shown by vector G. The Coriolis force is shown by vector F. The steady geostrophic wind is shown by vector W. In geostrophic balance the Coriolis force is an apparent force directed toward high pressure. The condition existing in the southern hemisphere is shown in Fig. 1b. In this case the wind is opposite in direction to that in the northern hemisphere and is directed toward the left of the pressure gradient.

The geostrophic wind flows along the isobars. In areas of high and low pressure, the isobars are curved. The circulation of air around these high and low pressure areas is therefore along curved paths. In a low pressure area the winds travel in counterclockwise directions in the northern hemisphere and clockwise in the southern hemisphere, as viewed from above the surface of the earth. Similarly, in a high pressure area, the winds travel in a clockwise direction in the northern hemisphere and in a counterclockwise direction in the southern hemisphere.

In flying into a low pressure area in the northern hemisphere, the barometric pressure gradually decreases and the counterclockwise motion of the wind will cause the aircraft to drift toward the right. In leaving the low pressure area, the barometric pressure will increase and the wind will blow from right to left, causing a left drift. If the plane is next flown into a high pressure area, the barometric pressure increases again, but the winds are blowing clockwise so that the aircraft will still be blown toward the left. As the center of the high or low pressure area is reached, more isobars are cut by the aircraft and higher winds are encountered.

One possible method for computing wind drift is to compare the readings of a barometric or pressure altimeter and a radio or FM altimeter at some starting point in the flight path and then to fly for some interval of time at either a constant radio altitude or a constant pressure altitude. At the end of this interval, the change in the pressure altimeter reading or radio altimeter reading, as the case may be, is noted and the wind drift may be computed in a manner which will now be described.

This method of determination of aircraft wind drift by the use of radio and pressure altimeters is based upon the fact that the geostrophic wind follows the isobars or lines of equal barometric pressure and possesses a speed proportional to the slope of the isobaric surface.

From the geostrophic wind equation, $$V_W = \frac{g}{f}\frac{dZ}{dG} \qquad (1)$$

where $V_W$ is the wind vector and $g$ is the acceleration due to gravity, $f$ is $2\Omega$, $\sin\phi$ is the Coriolis parameter, $\Omega$ is the angular velocity of the earth's rotation, $\phi$ is the latitude, $Z$ is the absolute height of a given isobaric surface above sea level and $G$ is the distance in the direction of the pressure gradient.

Referring to Fig. 2, assume that the plane is flown along a given isobaric surface, that is, at a constant pressure altimeter reading, with a speed and direction as indicated by vector $V_R$.

Since $$dG = V_{L_G} dt \qquad (2)$$

where $V_{L_G}$ is the component of the ground speed vector in the direction $G$ and $t$ is time $$V_W = \frac{g}{f}\frac{dZ}{V_{L_G} dt} \qquad (3)$$

From Fig. 2

$$V_{L_G} = V_{R_G} \qquad (4)$$

and $$V_{R_G} = V_R \sin(\beta + \psi) \qquad (5)$$

where $\beta$ is the drift angle, $\psi$ the angle that the wind makes with the track, and $V_{R_G}$ is the component of the true air speed vector $V_R$ in the direction $G$.

Equation 3 may be written as $$V_W = \frac{g}{f}\frac{dZ}{V_R \sin(\beta+\psi) dt} \qquad (6)$$

Rewriting Equation 6, $$V_W \sin(\beta+\psi) = \frac{g}{f}\frac{dZ}{V_R dt} \qquad (7)$$

The wind component normal to the true air speed vector $V_C$ is given by $$V_C = V_W \sin(\beta+\psi) \qquad (8)$$

Equation 7 thus becomes $$V_C = \frac{g}{f}\frac{dZ}{V_R dt} \qquad (9)$$

The term $V_R dt$ is equal to the product of the true air speed $V_R$ and the time interval between readings and is a distance which may be called $X$.

If the plane is flown at a constant altitude $Z_p$ on the pressure altimeter and, hence, on an isobaric surface, the radio altimeter is read at two different times separated by $t$ minutes giving the first altitude $Z_1$ and the second altitude $Z_2$. The term $dZ$ may, therefore, be written as $(Z_2-Z_1)$. Rewriting Equation 9

$$V_C = \frac{g}{f}\frac{Z_2-Z_1}{X} \qquad (10)$$

If $V_R$ is in knots $(Z_2-Z_1)$ is in feet and $X$ is in nautical miles, then Equation 10 becomes $$V_C = \frac{21.6}{\sin\phi}\frac{Z_2-Z_1}{X} \qquad (11)$$

The change in height of the given isobaric surface is $Z_2-Z_1$. Since the aircraft is flown along a fixed isobaric surface.

$$Z_2-Z_1 = \Delta D = D_2 - D_1 \qquad (12)$$

where $D$ is the change in height differential in feet, that is, the reading of the radio altimeter minus the reading of the pressure altimeter, and $D_1$ and $D_2$ are values of $D$ at successive points along the flight path of constant pressure altitude.

Since $\phi$ is a constant for the portion of the flight path over which observations are to be made, the geostrophic equation for use aboard aircraft may be written as $$V_C = K\frac{D_2-D_1}{X} \qquad (13)$$

In the northern hemisphere, if $V_C$ is positive, it will point to the left of an observer looking in the direction of the true heading; if $V_C$ is negative, the wind will be directed to the right. In the southern hemisphere the reverse is true.

Referring now to Fig. 2, it will be noted that the drift angle $\beta$ is given by $$\beta = \sin^{-1}\frac{V_C}{V_R} \qquad (14)$$

where $V_R$ is the true air speed.

To summarize, $V_C$ is determined by taking a radio altimeter reading and a pressure altimeter reading (after zero setting the pressure altimeter to 29.92 inches) at a given point in the flight path. The algebraic difference between these two readings is calculated and may be represented as $D_1$. At a subsequent time a second point in the flight path is reached, at which time a second reading of each of the altimeters is obtained and the difference again calculated. This second differential is $D_2$. Distance $X$ may be derived by multiplying the true air speed by the time interval between the two readings. If we assume the plane to be flying at a latitude between 55° N. and 70° N., the constant $K$ becomes 25 and $V_C$ is calculated from equation $$V_C = 25\frac{(D_2-D_1)}{X} \qquad (15)$$

Having determined $V_C$, the drift angle $\beta$ is determined from Equation 14. The direction of $V_C$ depends upon the sign of $V_C$, as previously stated.

The aforesaid method is disadvantageous in that the change in reading obtained is normally so small that comparatively long distances, which may be over one hundred miles, must be traveled before significant readings may be obtained and the aircraft heading corrected. Moreover, this method entails working with several figures which may be rather large and an algebraic subtraction must be made at each point of the flight path at which readings are obtained, since the sign of the difference in readings is important in determining the direction of the drift.

In accordance with this invention an accurate radio altimeter is constructed with its beat frequency proportional to altitude. The mechanism of a barometric or pressure altimeter is adapted to vary the resonant frequency of a conventional oscillator as a linear function of the barometric pressure or pressure altitude.

The outputs of the oscillator and the radio altimeter are fed into a frequency counter whose output is proportional to the difference in the frequency of said outputs. An indicating meter connected in said counter circuit is indicative of the difference between the two altimeter readings.

At the start of the run (point 1) the zero setting of the pressure altimeter mechanism is set so that the indicator reads zero. After an interval of time (point 2) the change in pressure altitude relative to the radio altitude will be directly readable on the indicator. In other words, quantity $(D_2-D_1)$ in Equation 15 may be read directly and easily and the determination of the wind drift from Equations 14 and 15 is greatly facilitated. The direction of the drift is readily obtained by noting on which side of center the indicator needle is deflected; for example, if the quantity $(D_2-D_1)$ is positive, that is, if the radio altitude exceeds the pressure altitude at point 2 in the flight path, the indicator pointer will deflect to the left, indicating a left drift and a deflection to the right will indicate a right drift. This condition exists provided the aircraft is flying in the northern hemisphere. If the aircraft is flying in the southern hemisphere the drift will be right when the indicator pointer deflects to the left of zero, and vice versa. By means of this invention, the necessity for considering the algebraic sign of $D_1$, $D_2$ and $(D_1-D_2)$ is eliminated, since the direction of drift can be noted at a glance from the indicator.

Referring to Fig. 3, a frequency modulated beat frequency altimeter 1 comprises a transmitter 10 which is frequency modulated by means of a frequency modulator 11, which may be a reactance tube circuit or any known means for cyclically varying the frequency of transmitter 10. A modulation generator 12 designed to produce an output which may be a wave of any suitable shape, such as a saw tooth wave, is connected to the input of modulator 11.

The frequency modulator carrier wave signal is supplied to transmitting antenna 13 and transmitted toward the terrain over which the aircraft in which the equipment is mounted is flying while a portion of the frequency modulated carrier wave energy is fed directly into a mixer or detector circuit 15. The reflected wave from the terrain is received by receiving antenna 14 and fed into mixer 15. The two inputs to mixer 15 differ in frequency by an amount equal to the product of the rate of change of frequency and twice the distance between the transmitter and the terrain. The output of mixer 15 is a beat signal whose frequency is the difference between said input frequency and a function of the distance from the equipment to the reflecting terrain. The beat frequency $f_d$ is given by $$f_d = \frac{4f_m \Delta f h}{c} \qquad (16)$$

where $f_m$ is the modulating frequency, $\Delta f$ the total frequency swing, $h$ the altitude and $c$ the velocity of propagation of electromagnetic radiation. With a 60 mc. sweep and 120 c. p. s. sweep rate at an altitude of 20,000 feet, the beat frequency would be approximately 600,000 C. P. S.

The output of mixer 15 is amplified in a conventional amplifier 16. The amplitude output is supplied to the negative limiter circuit 17 which performs the dual function of wave shaping and amplitude limiting. Negative limiter 17 may be a conventional parallel diode negative limiter which shapes the wave and passes only the positive portions of the amplified beat frequency signal. These positive pulses are fed into a frequency counter 18, as shown in Fig. 3.

A barometric or pressure altimeter 19 also forms a part of the wind drift computer. Altimeter 19, which will be described more fully in connection with the description of Fig. 5, comprises essentially a conventional aneroid barometer which is responsive to changes in barometric pressure. The movement of the bellows in said barometer is transmitted either directly or through a series of levers and gears to vary either the inductance or the capacitance in the tank circuit of a conventional oscillator 20. In this way, the frequency of said oscillator is varied in direct proportion to the altitude of the aircraft.

The output of oscillator 20 is amplified in amplifier 21 and the amplified output is in turn applied to a limiter 22 which serves not only as a wave shaping means but as an amplitude limiting means so that the limiter output is a series of negative pulses of constant amplitude and of the same frequency as the oscillator. Negative limiter 17 and positive limiter 22 are connected to a counter-indicator circuit 18, which is illustrated more clearly in Fig. 4, to be described later.

Referring now to Fig. 4, the counter-indicator circuit 18 comprises a pair of counters coupled back to back. The first or negative counter comprises a coupling capacitor 23, diodes 24 and 25, resistor 26, a zero-center milliammeter 29, and diodes 27 and 28. Positive pulses of a given frequency are applied to capacitor 23. The charge on capacitor 23 cannot change instantaneously as the positive leading edge is applied so that the plate of diode 25 becomes positive and diode 25 conducts. A charging current flows through the path including diode 25, current meter 29, resistor 26 and diodes 28 and 27 and ground, in that order, during the pulse time and a small charge is developed on capacitor 23. At the end of the pulse the drop in voltage places the diode side of capacitor 23 at a negative potential equal to the charge accumulated on capacitor 23. Diode 25 can no longer conduct since its plate is negative relative to the cathode. Diode 24 now conducts, thereby discharging through diode 24 and ground the small charge from the capacitor which would otherwise build up during each succeeding pulse. The current flow is indicated by the solid arrow and the meter needle will deflect to the left of zero. Since a certain amount of current flows through resistor 26 if the pulse is applied, an average current flows which increases as the pulse recurrence frequency (beat frequency) increases and vice versa.

The negative portion of counter-indicator 18 comprises a capacitor 23', a pair of diodes 27 and 28, resistor 26, meter 29 and diodes 25 and 24. The connections of the diodes 27 and 28 are reversed from those of diodes 24 and 25 so that the circuit is responsive to the negative pulses from limiter 22. Diode 28 conducts during the time that the negative pulse is applied and a resulting electron current flows in the path comprising diode 28, resistor 26, milliammeter 29, diode 25, diode 24 and ground, in that order, as indicated by the dotted arrows. At the end of the negative pulse, diode 27 conducts to remove the charge developed on condenser 23' during the pulse time. The current indicated by the dotted arrow through resistor 26 and meter 29 increases with an increase in frequency of the output from limiter 22. With the current flowing in the direction of the dotted arrow the meter needle will deflect to the right of zero. Meter 29 will indicate magnitude and direction of the resultant of the currents flowing in opposite directions therethrough as a result of the signals from limiters 17 and 22.

The resultant current flow in resistor 26 and indicating meter 29 is a linear function of the difference in frequency between the output of radio altimeter 1 and the output of oscillator 20, and, since the aforesaid outputs are directly proportional to the radio altitude and pressure altitude, respectively, the indicating meter is indicative of the difference between these two altitudes and may be calibrated in any desired unit of height, such as in feet.

The direction of the wind may be indicated by noting the direction of deflection of the indicating meter needle relative to the zero or center of the meter dial. If the pressure altimeter is adjusted so that the indicating meter reads zero at the first point in the flight path, the meter will deflect to the left or zero if, at the second point in the flight path, the radio altitude exceeds the pressure altitude in magnitude. In the northern hemisphere, this corresponds to a left drift resulting from the wind blowing toward the left. If the pressure altitude exceeds the radio altitude at the second point in the flight path, however, the meter will deflect toward the right and will be indicative of a right drift in the northern hemisphere. In the southern hemisphere the direction of the drift will be the reverse of that in the northern hemisphere so that a deflection of the meter needle to the right will indicate a left drift or vice versa. The portion of the meter scale to the left of center may be marked "Left-Northern" and the portion of the meter scale to the right of zero may be marked "Right-Northern," or in any other convenient manner.

Referring now to Fig. 5, a typical pressure altimeter is shown. As previously stated, pressure altimeter 19 is a conventional aneroid barometer sealed in case 30 and having inlet 31 connected to a pitot static line for ingress of free air. An evacuated bellows 32 is fixedly attached to the top of case 30 by a support member 33. Changes in pressure in the static line cause bellows 32 to either expand or contract. For example, if the pressure decreases with increased altitude, the bellows expand and rod 34, attached to the bottom of said bellows, moves downward. A pin 35 is fastened to rod 34 and is adapted to move in a slot 36 in a rocker arm 37. The latter has a flanged portion or boss 38 in which a pivot 39 is inserted. The pivot is fixed to a support 40. The rocker arm is thereby free to rotate about pivot 39. At the other end of the slotted rocker arm, a rod 41 is connected to a pin 42 in slot 43. Rod 41 has an enlarged portion in the form of a rack 44. The end of rod 41 remote from rocker arm 37 extends externally of case 30 through a flanged portion 45 in the bottom of the case. A spring 46 inserted between the flanged portion 45 and rack 44 serves as a biasing means. A powdered iron core 47 is fastened to the end of rod 41 external to the case. A counter weight 48 fastened to the rod 34 serves to counter balance the force exerted on the righthand end of racker arm 37 owning to the weight of rod 41 includnig rack 44, and core 47. A pinion 49 engages rack 44 and is connected to a shaft 50 which rotates in bearings 51 and 52 supported by members 53 and 54, respectively. The shaft 58 may be connected by any desired system of gearing (not shown) to a pointer which moves across the scale of the altimeter. This scale may be graduated in milliabars or in feet.

Core 47, by virture of the downward movement of rod 34, is pulled upward by rocker arm 37, thereby decreasing the inductance of coil 55. Coil 55 and condenser 56 in parallel thereto comprise the tank circuit of a conventional oscillator 20, described in Fig. 1. As this core 47 moves upward and out of tank coil 55 the frequencq of oscillator 20 is increased.

Another method of varying the frequency of oscillator 20 in accordance with the changes in barometric pressure is shown in Fig. 6. A pair of compound plates 60 and 61 is attached to the top and bottom, respectively, of bellows 32. The portions 63 and 64 of compound plates 60 and 61 are metallic and are soldered to the bellows. Insulating portions 65 and 66 are fastened at one end to portions 63 and 64, respectively. The other ends of portions 65 and 66 are bolted or riveted to a pair of metallic plates 67 and 68, respectively. These metallic plates serve as the plates of a variable tank condenser 70 of oscillator 20. As the pressure varies, the bellows contract or expand, as the case may be, causing a movement of plate 68 relative to fixed plate 67 and thereby changing the capacity of condenser 70 and thus the frequency of oscillator 20.

The invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A wind drift computer for use in aircraft comprising a frequency-modulated radio altimeter including means for radiating frequency-modulated energy toward the terrain over which the aircraft is flying, means for receiving energy reflected from the terrain, means for combining the reflected and transmitted energy, and means responsive to said combining means for producing a beat frequency signal whose frequency is indicative of the altitude of said aircraft, a pressure altimeter having a mechanism whose movement is a function of barometric pressure, a source of electrical energy, means for varying the frequency of said source in accordance with the movement of said mechanism, circuit means energized by both said beat frequency signal and said frequency-modulated source and productive of a current whose amplitude is proportional to the difference in frequency of said signal and said source, and an indicator included in said circuit means for indicating magnitude and direction of the relative change in readings of said altimeters.

2. A wind drift computer for use in aircraft comprising a frequency-modulated radio altimeter including means for radiating frequency-modulated energy toward the terrain over which the aircaft is flying, means for receiving energy reflected from the terrain, means for combining the reflected and transmitted energy, and means responsive to said combining means for producing a beat frequency signal whose frequency is indicative of the altitude of said aircraft, a pressure altimeter having a mechanism whose movement is a function of barometric pressure, a source of electrical energy, means for varying the frequency of said source in accordance with the movement of said mechanism, limiter circuits connected to the output of said radio altimeter and said source for producing outputs of uniform amplitude, circuit means energized by said limiter circuits and productive of a current whose amplitude is proportional to the difference in frequency of said signal and said source, and an indicator included in said circuit means for indicating magnitude and direction of the relative change in readings of said altimeters.

3. A wind drift computer for use in aircraft comprising a frequency-modulated radio altimeter including means for radiating frequency-modulated energy toward the terrain over which the aircraft is flying, means for receiving energy reflected from the terrain, means for combining the reflected and transmittted energy, and means responsive to said combining means for producing a beat frequency signal whose frequency is indicative of the altitude of said aircraft, a pressure altimeter having a mechanism whose movement is a function of barometric pressure, a source of electrical energy, means for varying the frequency of said source in accordance with the movement of said mechanism, a negative limiter circuit connected to the output of said radio altimeter, a positive limiter circuit connected to the output of said source, a frequency couning means energized by said limiter circuits and productive of a current whose amplitude is proportional to the difference in frequency of said signal and said source, and an indicator included in said circuit means for indicating magnitude and direction of the relative change in readings of said altimeters.

References Cited in the file of this patent

UNITED STATES PATENTS

| | | |
|---|---|---|
| 2,042,490 | Zahl | June 2, 1936 |
| 2,518,916 | Luck | Aug. 15, 1950 |
| 2,562,186 | Hallman | July 31, 1951 |